(12) United States Patent
Ohkubo

(10) Patent No.: US 10,611,350 B2
(45) Date of Patent: Apr. 7, 2020

(54) ELECTRIC BRAKE DEVICE

(71) Applicant: TOYOTA JIDOSHA KABUSHIKI KAISHA, Toyota-shi, Aichi-ken (JP)

(72) Inventor: Masayasu Ohkubo, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 12 days.

(21) Appl. No.: 16/015,954

(22) Filed: Jun. 22, 2018

(65) Prior Publication Data

US 2019/0061713 A1 Feb. 28, 2019

(30) Foreign Application Priority Data

Aug. 22, 2017 (JP) ................. 2017-159713

(51) Int. Cl.
| | | |
|---|---|---|
| B60T 13/18 | (2006.01) | |
| B60T 8/17 | (2006.01) | |
| B60T 1/06 | (2006.01) | |
| F16D 65/18 | (2006.01) | |
| B60T 13/74 | (2006.01) | |
| B60T 13/66 | (2006.01) | |
| F16D 55/226 | (2006.01) | |
| F16D 121/24 | (2012.01) | |

(52) U.S. Cl.
CPC .............. B60T 8/17 (2013.01); B60T 1/065 (2013.01); B60T 13/662 (2013.01); B60T 13/741 (2013.01); F16D 55/226 (2013.01); F16D 65/18 (2013.01); F16D 65/183 (2013.01); B60T 2201/12 (2013.01); F16D 2121/24 (2013.01)

(58) Field of Classification Search
CPC ... F16D 65/18; B60T 8/17; B60T 8/32; B60T 8/171; B60T 13/18; B60T 13/74; B60T 13/741; B60L 7/26
USPC .............. 188/1.11 E, 1.11 L, 72.3, 156–164; 303/3, 15, 20, 115.2, 155
See application file for complete search history.

(56) References Cited

U.S. PATENT DOCUMENTS

| | | | | |
|---|---|---|---|---|
| 6,481,805 | B1 * | 11/2002 | Ichinose | B60T 7/042 188/72.3 |
| 9,709,112 | B2 * | 7/2017 | Masuda | F16D 65/18 |
| 9,746,041 | B2 * | 8/2017 | Masuda | B60T 13/741 |
| 9,915,308 | B2 * | 3/2018 | Masuda | B60T 13/741 |

(Continued)

FOREIGN PATENT DOCUMENTS

JP 2012-240632 A 12/2012

*Primary Examiner* — Christopher P Schwartz
(74) *Attorney, Agent, or Firm* — Sughrue Mion, PLLC

(57) ABSTRACT

A vehicle electric brake device configured such that, when no braking force request is made, a piston of an actuator of the electric brake device is retracted to a set backward position so as to allow a clearance to exist between a friction member and a rotary body of the device, wherein a controller of the device is configured to execute, for the actuator, a clearance removing control in which the piston is advanced at a first speed and subsequently advanced such that a piston advancing speed is reduced from the first speed to a second speed, so as to remove the clearance, the clearance removing control being executed when the braking force request is generated, and a braking-force-request-dependent control in which a braking force in accordance with a degree of the braking force request is generated, the braking-force-request-dependent control being executed after execution of the clearance removing control.

8 Claims, 6 Drawing Sheets

(56) References Cited

U.S. PATENT DOCUMENTS

2014/0069750 A1 3/2014 Nohira et al.
2018/0099651 A1* 4/2018 Yogo ...................... B60T 8/171

* cited by examiner

ELECTRIC BRAKE DEVICE

CROSS REFERENCE TO RELATED APPLICATION

The present application claims priority from Japanese Patent Application No. 2017-159713, which was filed on Aug. 22, 2017, the disclosure of which is herein incorporated by reference in its entirety.

BACKGROUND

Technical Field

The following disclosure relates to an electric brake device for a vehicle.

Description of Related Art

It is recently proposed to employ, as a brake device for a vehicle, a brake device as disclosed in Japanese Patent Application Publication No. 2012-240632, i.e., an electric brake device configured to generate a braking force that depends on a force exerted by an electric motor. The electric brake device is typically configured to generate a braking force such that a piston is advanced by an electric motor so as to push friction members (such as brake pads) onto a rotary body (such as a disc rotor) that rotates with a wheel. When there is no request for the braking force, namely, in a non-request condition of the braking force, it is possible to retract the piston by the electric motor to such an extent that a state in which a sufficient clearance exists between the rotary body and the friction members is established, as described in the Publication described above, for instance. (The state will be hereinafter referred to as "clearance existing state" where appropriate.) Owing to the establishment of the clearance existing state, it is possible to avoid or reduce, in the non-request condition of the braking force, a phenomenon in which the rotary body rotates while being in contact with the friction members, namely, the so-called drag phenomenon.

SUMMARY

In the electric brake device described in the Publication, a position of the piston to which the piston is advanced is adjusted in the non-request condition of the braking force such that an amount of the clearance falls within an appropriate range, for ensuring good response of the brake device, in other words, for shortening a length of time from a time point of generation of the braking force request to a time point of generation of an actual braking force. It is, however, difficult to allow an appropriate clearance to exist due to an influence of a displacement of a caliper arising from a change in a vehicle running condition, for instance. In view of the drag phenomenon described above, it is preferable that the clearance be large to a certain extent. In the case where the clearance is made large, it is preferable to advance, in consideration of the response, the piston at a high speed so as to quickly remove the large clearance when the braking force request is generated. The advancing movement of the piston at a high speed may cause the friction member to hit against the rotary body or may cause the piston to hit against a backup member of the friction member. In this case, various problems may be caused such as generation of impact noise or sound and hindrance to a smooth operation of the brake device due to an abrupt change in the speed of the piston, resulting in deterioration in utility of the electric brake device. Accordingly, the present disclosure relates to an electric brake device having high utility.

In one aspect of the present disclosure, an electric brake device is configured to establish the clearance existing state described above in the non-request condition of the braking force and configured to execute, when a braking force request is generated, a control (clearance removing control) in which the piston is advanced at a first speed and subsequently advanced such that an advancing speed of the piston is reduced from the first speed to a second speed, so as to remove the clearance and to execute, after execution of the control, a control (braking-force-request-dependent control) in which a braking force in accordance with a degree of the braking force request is generated.

Advantageous Effects

According to the electric brake device of the present disclosure, the piston is advanced at a relatively high speed when the braking force request is generated, and the clearance is removed in a state in which the piston is decelerated. In the thus configured electric brake device, response is relatively good, in other words, a length of time from a time point of generation of the braking force request to a time point of generation of an actual braking force is relatively short. Further, the generation of the impact noise described above is prevented or reduced, and the electric brake device can smoothly operate. Thus, the electric brake device according to the present disclosure has high utility.

FORMS OF THE INVENTION

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention.

(1) An electric brake device for a vehicle, comprising: a rotary body configured to rotate with a wheel; a friction member configured to be pushed onto the rotary body; an actuator configured to advance a piston by an electric motor so as to push the friction member onto the rotary body; and a controller configured to control the actuator, the electric brake device being configured such that, when no braking force request is made, the piston is retracted to a set backward position so as to allow a clearance to exist between the friction member and the rotary body, wherein the controller is configured to execute, for the actuator, a clearance removing control in which the piston is advanced at a first speed and subsequently advanced such that an advancing speed of the piston is reduced from the first speed to a second speed, so as to remove the clearance, the clearance removing control being executed when the braking force request is generated, and a braking-force-request-dependent control in which a braking force in accordance with a degree of the braking force request is generated, the braking-force-request-dependent control being executed after execution of the clearance removing control.

According to the electric brake device in this form, the clearance existing state is established in the non-request condition of the braking force, so that the drag phenomenon described above is avoided or reduced. Thus, this form enables construction of an electric brake with a small loss of a vehicle driving energy, namely, a brake system that improves fuel economy of the vehicle. There may be employed, as a means for establishing the clearance existing state, a means for retracting the piston to the set backward position by the electric motor when the braking force request becomes absent or a means for retracting the piston in dependence on a force of a biasing member such as a spring when the braking force request becomes absent.

According to the electric brake device of this form, even if a relatively large clearance exists in the non-request condition of the braking force, the clearance is removed in a relatively short time by advancing the piston at the first speed which is a relatively high speed. Further, the friction member comes into contact with the rotary body in a state in which the speed of the piston is reduced to the second speed, making it possible to avoid or reduce generation of the impact noise described above. Moreover, a change in the speed of the piston when the friction member comes into contact with the rotary body can be made relatively small, ensuring a smooth operation of the electric brake device.

The "braking force request" in this form may be based on a brake operation by a driver as explained below or may be based on a request for automatic brake made by a system for executing collision avoidance, automated or autonomous driving, or the like. The electric brake device in this form is not limited to a disc brake in which a disc rotor functions as the rotary body and a brake pad functions as the friction member, but may be a drum brake in which an inner circumferential portion of a wheel or a drum functions as the rotary body and a shoe functions as the friction member.

(2) The electric brake device according to the form (1), wherein the first speed is equal to a speed when an admissible maximum current is supplied to the electric motor.

In short, this form includes a form in which the piston is advanced, immediately after generation of the braking force request, at the highest speed that can be expected. According to such a form, the clearance can be removed in a relatively short time, so that an electric brake device excellent in response can be constructed.

(3) The electric brake device according to the form (1) or (2), wherein the second speed is determined based on a speed at which the piston is estimated to advance in the braking-force-request-dependent control that is executed after the clearance has been removed.

(4) The electric brake device according to any one of the forms (1)-(3), wherein the second speed is determined based on an increase gradient of the degree of the braking force request.

The braking force starts to be generated from a time point when the clearance is removed by contact of the friction member with the rotary body, specifically, from a time point when the disc rotor (as the rotary body) is sandwiched by brake pads (each including the friction member). As the friction member is further pushed onto the rotary body, the braking force increases in accordance with a pushed amount by which the rotary body is pushed by the friction member. The pushed amount generally depends on an amount of elastic deformation of the friction member. Accordingly, an amount of the advancing movement of the piston after the clearance has been removed depends on the degree of the braking force request. Further, a speed of the advancing movement of the piston after the clearance has been removed depends on the increase gradient of the braking force. The above two forms are based on the theory. The above two forms enable the speed of the advancing movement of the piston at an end timing of the clearance removing control to coincide with or get close to the speed of the advancing movement of the piston at a start timing of the braking-force-request-dependent control. It is thus possible to particularly smoothly operate the electric brake device. The "speed at which the piston is estimated to advance in the braking-force-request-dependent control" mainly means a speed at which the piston advances according to the braking-force-request-dependent control when the braking-force-request-dependent control starts. This speed will be hereinafter referred to as "estimated advancing speed after removal of the clearance" where appropriate. For instance, in the latter of the above two forms, the estimated advancing speed after removal of the clearance may be determined to be higher when the increase gradient is larger. For instance, the increase gradient may be recognized only once immediately after the generation of the braking force request, and the second speed may be determined only once in one brake operation based on the recognized increase gradient. Alternatively, the increase gradient may be successively recognized during execution of the clearance removing control, and the second speed may be determined so as to be successively updated during execution of the clearance removing control based on the successively recognized increase gradient.

(5) The electric brake device according to any one of the forms (1)-(4), wherein the controller is configured to end the clearance removing control at a time point when the piston advances to a position at which the clearance is estimated to be removed and to execute the braking-force-request-dependent control from the time point.

According to this form, the clearance removing control is ended at a position at which the clearance is estimated to be removed (hereinafter referred to as "estimated clearance removal position" where appropriate), so that the electric brake device is operated without time loss. The estimated clearance removal position may be a position that is set in advance. Further, there may be stored an advanced position of the piston at which the braking force was actually generated when a preceding braking force request was made, and the stored position may be set as the estimated clearance removal position in a current operation of the electric brake device. Moreover, some margin may be provided for the stored position, and the margin-provided position may be set as the estimated clearance removal position. The estimated clearance removal position may be also referred to as "expected clearance removal position". The "advanced position" of the piston may be regarded as a position of the piston that indicates how far the piston has moved forward from the set backward position and may be hereinafter referred to as "piston position" where appropriate.

(6) The electric brake device according to any one of the forms (1)-(5), wherein, in the clearance removing control, the piston is advanced such that the advancing speed of the piston is reduced from the first speed to the second speed while a decrease gradient of the advancing speed of the piston is gradually reduced.

This form limits a manner of reducing the advancing speed of the piston from the first speed to the second speed. For instance, a reduction in the advancing speed of the piston with respect to an elapsed time or a distance of the advancing movement of the piston can be represented as a graph in which a horizontal axis represents the elapsed time or the piston position and a vertical axis represents the advancing speed of the piston. In the graph, a line indicating a change in the advancing speed of the piston in the process of the speed reduction is a downwardly convex curved line, for instance. In other words, in this form, the advancing speed of the piston in the process of the speed reduction is largely reduced at an initial stage of the speed reduction. As the clearance becomes smaller, namely, as the time elapses, the advancing speed changes such that a rate of reduction becomes smaller.

For instance, even if the clearance removing control is configured to be ended at the time point when the piston has advanced to the estimated clearance removal position as explained above, the clearance is not always removed exactly at the time point. It is expected that the piston position at which the clearance is actually removed may slightly deviate from the estimated clearance removal position depending upon the vehicle running condition or the like. According to this form, the change in the advancing speed of the piston is relatively small just before the clearance removing control is ended. Thus, even if the piston position at which the clearance is actually removed may deviate, the piston relatively smoothly moves upon switching from the clearance removing control to the braking-force-request-dependent control.

(7) The electric brake device according to any one of the forms (1)-(6), further comprising a sensor configured to detect a braking force being actually generated by the electric brake device, wherein, in the braking-force-request-dependent control, a current to be supplied to the electric motor is controlled such that the braking force detected by the sensor coincides with the degree of the braking force request.

In this form, a limitation as to a manner of the braking-force-request-dependent control is added. In the clearance removing control, the advancing speed of the piston is controlled whereas, in the braking-force-request-dependent control according to this form, there is executed a feedback control with respect to the actual braking force based on the degree of the braking force request. That is, a subject to be controlled differs between the two controls. As long as the clearance removing controls described above is executed, the electric brake device smoothly operates upon switching from the clearance removing control to the braking-force-request-dependent control even though the braking-force-request-dependent control whose control subject differs from that of the clearance removing control is executed after the clearance removing control.

(8) The electric brake device according to any one of the forms (1)-(7), wherein the degree of the braking force request is estimated at least based on a brake operation force applied to a brake operation member by a driver.

This form is for generating the braking force not based on the so-called automatic brake but based on the brake operation performed by the driver on a brake operation member such as a brake pedal. While the degree of the braking force request can be estimated based on a brake operation amount which is an operation amount of the brake pedal, instead of the brake operation force, the brake operation force enables more accurate estimation of the degree of the braking force request than the brake operation amount. In short, the brake operation force more accurately indicates what magnitude of the braking force the driver intends to generate, namely, a driver's intention. Thus, this form enables generation of more accurate braking force in the braking-force-request-dependent control. It is noted that this form does not exclude estimation of the degree of the braking force request based on both of the brake operation force and the brake operation amount.

The brake operation force may be estimated based on a detection value of a sensor provided for the brake operation member, for instance. In the case where a hydraulic brake device is also installed on the vehicle on which the electric brake device is installed and the hydraulic brake device is equipped with a master cylinder for pressurizing the working fluid by the operation of the brake operation member, a master pressure which is a pressure of the working fluid pressurized by the master cylinder may be detected and the brake operation force may be estimated based on the detected pressure. At the beginning of the brake operation, a delay is likely to occur in an actually detected brake operation force with respect to the brake operation, as in a case in which the brake operation force is estimated based on the master pressure, in particular. Accordingly, it is desirable that the degree of the braking force request be estimated at least based on the brake operation amount at the beginning of the brake operation.

(9) The electric brake device according to any one of the forms (1)-(8), wherein the clearance removing control is executed such that the piston is advanced at the first speed until a removed amount of the clearance becomes equal to a set amount held in a range from not less than ⅓ to not greater than ⅔ of an amount of the clearance which has existed before the execution of the clearance removing control.

The clearance described above is actually about 1 mm at the largest. To remove the clearance by first advancing the piston at a high speed and subsequently decelerating the piston, it is desirable to start deceleration from the first speed to the second speed when the piston is advanced by a distance corresponding to the set amount specified in this form, for achieving both of good response and smooth operation.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
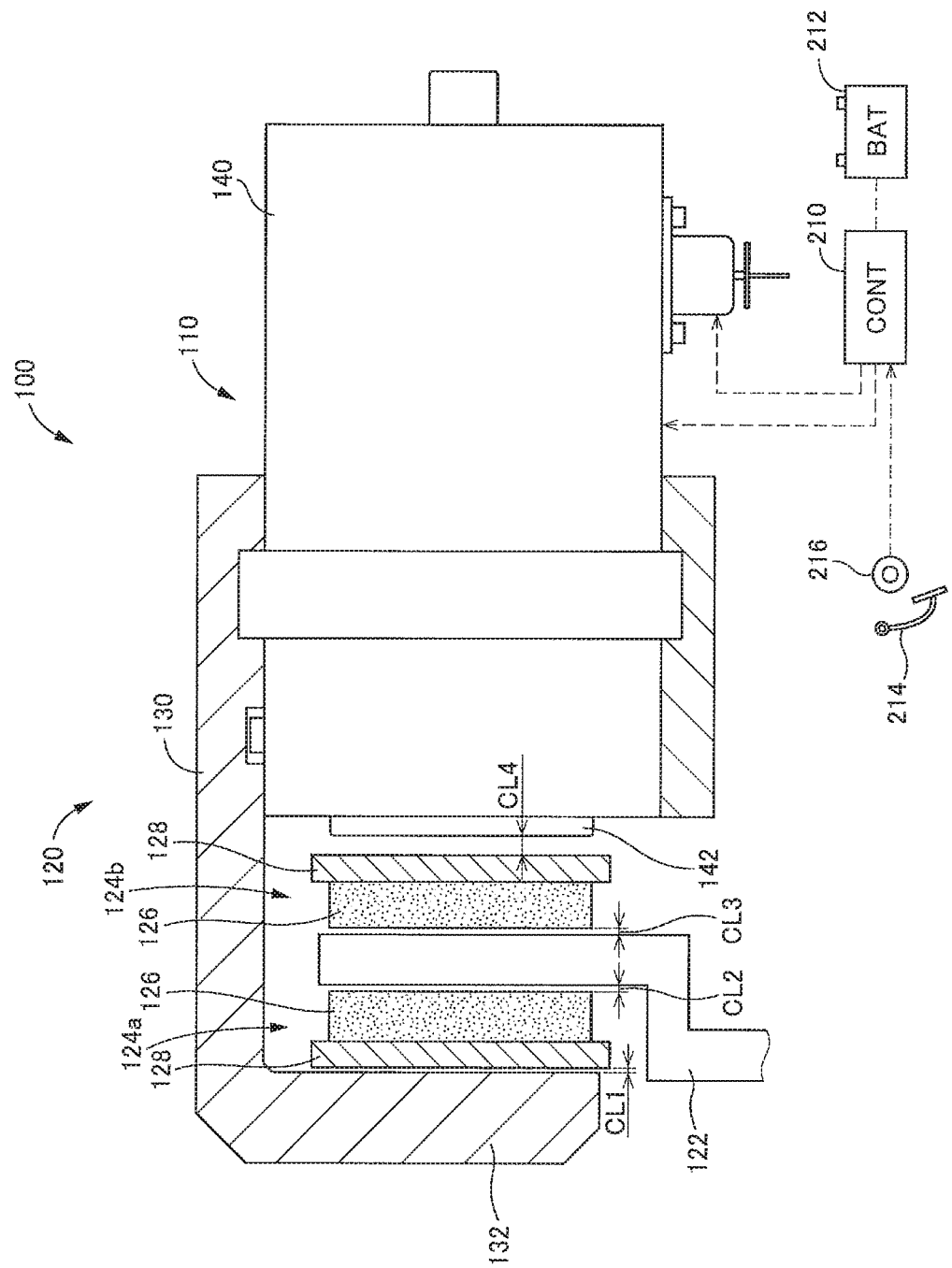
FIG. 1 is a cross-sectional view of an electric brake device according to one embodiment.

Referring to the drawings, there will be explained below in detail an electric brake device according to one embodiment of the claimable invention. It is to be understood that the claimable invention is not limited to the details of the following embodiment but may be embodied based on the forms described in Forms of the Invention and may be changed and modified based on the knowledge of those skilled in the art.

[A] Structure of Electric Brake Device

As shown in FIG. 1, an electric brake device 100 according to the present embodiment includes: a brake caliper 120 (hereinafter simply referred to as "caliper 120" where appropriate) in which an electric brake actuator 110 (hereinafter simply referred to as "actuator 110" where appropriate) is disposed as a principal constituent element; and a disc rotor 122, as a rotary body, configured to rotate together with a wheel.

i) Structure of Brake Caliper

The caliper 120 is held by a mount (not shown) provided in a carrier (not shown) that rotatably holds the wheel, such that the caliper 120 is movable in the axial direction, i.e., the right-left direction in FIG. 1 and such that the caliper 120 extends across over the disc rotor 122. A pair of brake pads (hereinafter simply referred to as "pads" where appropriate) 124a, 124b are held by the mount so as to sandwich the disc rotor 122 therebetween in a state in which the pads 124a, 124b are movable in the axial direction. Each of the pads 124a, 124b includes a friction member 126 disposed on one side thereof on which the pad 124a, 124b comes into contact with the disc rotor 122 and a backup plate 128 supporting the friction member 126.

For the sake of convenience, a left side and a right side in FIG. 1 are defined as a front side and a right side, respectively. The pad 124a located on the front side is supported by a front end portion (claw portion) 132 of a caliper main body 130. The actuator 110 is held by a rear-side portion of the caliper main body 130 such that a housing 140 of the actuator 110 is fixed to the rear-side portion of the caliper main body 130. The actuator 110 includes a piston 142 configured to advance and retract relative to the housing 140. When the piston 142 advances, a front end portion, namely, a front end, of the piston 142 comes into engagement with the rear-side pad 124b, specifically, comes into engagement with the backup plate 128 of the pad 124b. When the piston 142 further advances while being kept engaged with the backup plate 128 of the pad 124b, the pair of pads 124a, 124b sandwich or nip the disc rotor 122 therebetween. In other words, the friction members 126 of the respective pads 124a, 124b are pushed onto the disc rotor 122. Owing to the pushing of the friction members 126 of the pads 124a, 124b onto the disc rotor 122, there is generated a braking force for stopping rotation of the wheel that depends on a friction force between the disc rotor 122 and the friction members 126, namely, there is generated a braking force for reducing the speed of the vehicle or stopping the vehicle.

ii) Structure of Electric Brake Actuator

Figure 2:
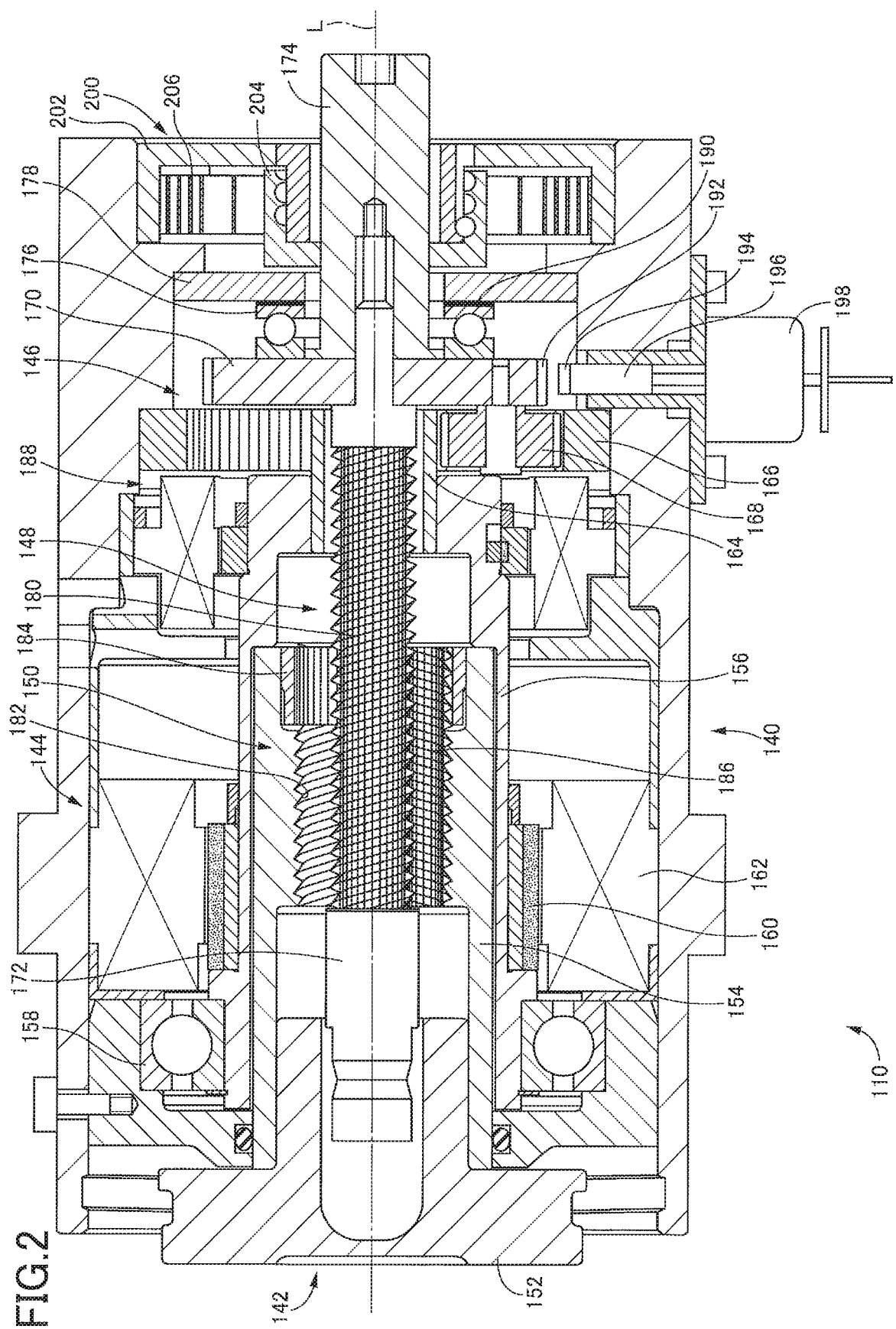
FIG. 2 is a cross-sectional view of an electric brake actuator of the electric brake device shown in FIG. 1.

As shown in FIG. 2, the actuator 110 includes the housing 140, the piston 142, an electric motor 144 as a drive source, a speed reducer 146 for decelerating rotation of the electric motor 144, an input shaft 148 configured to be rotated by the rotation of the electric motor 144 decelerated by the speed reducer 146, and a motion converting mechanism 150 configured to convert the rotating motion of the input shaft 148 into the advancing and retracting movement of the piston 142. In the following explanation, a left side and a right side in FIG. 2 will be respectively referred to as a front side and a rear side, for convenience sake.

The piston 142 includes a piston head 152 and an output sleeve 154 which is a hollow cylindrical portion of the piston 142. The electric motor 144 includes a cylindrical rotary drive shaft 156. The output sleeve 154 is disposed in the rotary drive shaft 156, and the input shaft 148 is disposed in the output sleeve 154, such that the output sleeve 154, the rotary drive shaft 156, and the input shaft 148 are coaxial relative to each other, specifically, such that respective axes of the rotary drive shaft 156, the output sleeve 154, and the input shaft 148 coincide with an axis L common thereto. Thus, the actuator 110 is compact in size.

The rotary drive shaft 156 is held by the housing 140 via a radial bearing 158 so as to be rotatable and immovable in an axial direction (which is a direction of extension of the axis L and coincides with the right-left direction in FIG. 2). The electric motor 144 includes magnets 160 disposed on one circumference of an outer circumferential portion of the rotary drive shaft 156 and coils 162 fixed to an inner circumferential portion of the housing 140 so as to surround the magnets 160.

The speed reducer 146 is of a planetary gear type including a hollow sun gear 164 attached and fixed to a rear end of the rotary drive shaft 156, a ring gear 166 fixed to the housing 140, a plurality of planetary gears 168 (only one of which is illustrated in FIG. 2) engaging with both of the sun gear 164 and the ring gear 166 so as to revolve about the sun gear 164. Each of the planetary gears 168 is rotatably held by a flange 170 as a carrier. The input shaft 148 includes a front-side shaft 172 that constitutes a front-side portion of the input shaft 148 and a rear-side shaft 174 that constitutes a rear-side portion of the input shaft 148, the front-side shaft 172 and the rear-side shaft 174 being threadedly engaged with each other. The flange 170 is sandwiched between and fixed by the front-side shaft 172 and the rear-side shaft 174, whereby the flange 170 rotates together with the front-side shaft 172 and the rear-side shaft 174, namely, rotates together with the input shaft 148. The rotation of the rotary drive shaft 156, namely, the rotation of the electric motor 144, is decelerated by the speed reducer 146 and transmitted as the rotation of the input shaft 148. The input shaft 148 is held by the housing 140 via the flange 170, a thrust bearing 176, and a support plate 178, so as to be rotatable and immovable in the axial direction.

The motion converting mechanism 150 is constituted by: an externally threaded and toothed portion 180 which is provided on an outer circumferential portion of the front-side shaft 172 of the input shaft 148 and on which external threads and external teeth are formed; an internally threaded portion 182 which is provided in the output sleeve 154 of the piston 142 and on which internal threads are formed; a ring gear 184 which is inserted into and fixed to a rear end portion of the output sleeve 154 and on which internal teeth are formed; and a plurality of planetary rollers 186 (only one of which is illustrated in FIG. 2) provided between the outer circumferential portion of the front-side shaft 172 and an inner circumferential portion of the output sleeve 154. External threads and external teeth, which are similar to those formed on the outer circumferential portion of the front-side shaft 172, are formed on an outer circumferential portion of each planetary roller 186. In all of the externally threaded and toothed portion 180 of the front-side shaft 172 and the planetary rollers 186, the external teeth are formed over the entirety of the area in which the external threads are formed. Thus, it seems that a texture is formed on the outer circumferential surfaces.

The external teeth of each planetary roller 186 are held in engagement with the external teeth of the externally threaded and toothed portion 180 of the front-side shaft 172 and the internal teeth of the ring gear 184. The external threads of each planetary roller 186 are threadedly engaged with the external threads of the externally threaded and toothed portion 180 of the front-side shaft 172 and the internal threads of the internally threaded portion 182 of the output sleeve 154. The pitch of the external threads of the externally threaded and toothed portion 180, the pitch of the external threads of the planetary roller 186, and the pitch of the internal threads of the internally threaded portion 182 are mutually the same while the number of external threads of the externally threaded and toothed portion 180, the number of external threads of the planetary roller 186, and the number of internal threads of the internally threaded portion 182 are mutually different.

The motion converting mechanism 150 is known in the art, and its structure and operating principle are explained in detail in Japanese Patent Application Publication No. 2007-56952, for instance. Thus, the motion converting mechanism 150 will be briefly explained. Roughly speaking, in the motion converting mechanism 150, a ratio of the number of external teeth of each planetary roller 186 and the number of internal teeth of the ring gear 184 is equal to a ratio of the number of external threads of the planetary roller 186 and the number of internal threads of the internally threaded portion 182 of the output sleeve 154 whereas a ratio of the number of external teeth of the planetary roller 186 and the number of external teeth of the externally threaded and toothed portion 180 of the front-side shaft 172 is different from a ratio of the number of external threads of the planetary roller 186 and the number of external threads of the externally threaded and toothed portion 180 of the front-side shaft 172. That is, there exists a difference in motions between the planetary roller 186 and the front-side shaft 172.

The piston 142 is inhibited from rotating about the axis, that is, the output sleeve 154 is inhibited from rotating about the axis. When the input shaft 148 rotates, the planetary rollers 186 revolve about the front-side shaft 172 of the input shaft 148 while rotating. On this occasion, the planetary rollers 186 and the output sleeve 154 do not move relative to each other in the axial direction, and the planetary rollers 186 and the input shaft 148 move relative to each other in the axial direction, based on the relationship between the ratio of the number of teeth and the ratio of the number of threads. That is, the piston 142 and the planetary rollers 186 move as a unit in the axial direction relative to the input shaft 148, based on the difference in motions thereof.

As apparent from the explanation, in the actuator 110, the rotation of the electric motor 144 causes the piston 142 to be advanced or retracted. FIG. 2 shows a state in which the piston 142 is positioned at the rearmost position in its movable range (hereinafter referred to as "set backward position" where appropriate). Specifically, when the electric motor 144 rotates forwardly from this state, the piston 142 is advanced, and, as apparent from FIG. 1, the pads 124*a*, 124*b* are pushed onto the disc rotor 122 with the front end of the piston 142 held in engagement with the pad 124*b*, so that the braking force is generated. In this respect, the magnitude of the braking force corresponds to an electric current supplied to the electric motor 144. Subsequently, when the electric motor 144 rotates reversely, the piston 142 is retracted, and the piston 142 and the pad 124*b* are accordingly disengaged from each other, so that the braking force is not generated. Finally, the piston 142 returns to the set backward position shown in FIG. 2.

In addition to the constituent components described above, the actuator 110 includes a resolver 188 for detecting a rotation angle of the electric motor 144. The resolver 188 functions as a motor rotation angle sensor. Based on a detection signal of the resolver 188, the position and the movement amount of the piston 142 in the axial direction can be detected. Further, there is disposed, between the support plate 178 and the thrust bearing 176, an axial-force sensor 190 (as a load cell) for detecting a force in a thrust direction acting on the input shaft 148, namely, an axial force. The axial force corresponds to a force by which the piston 142 pushes the brake pad 124*b* onto the disc rotor 122. Based on a detected value of the axial-force sensor 190, it is possible to detect the braking force being generated by the electric brake device 100.

The actuator 110 further includes a mechanism configured to inhibit the rotation of the input shaft 148 for allowing the electric brake device 100 to operate as an electric parking brake. Specifically, ratchet teeth 192 are formed on an outer circumferential portion of the flange 170, and there are provided: a plunger 196 having, at its distal end, a locking pawl 194 for locking the ratchet teeth 192; and a solenoid 198 fixed to the outer circumferential portion of the housing 140 for advancing and retracting the plunger 196. When the electric motor 144 rotates forwardly in a state in which the solenoid 198 is energized to permit the plunger 196 to protrude, the locking pawl 194 locks the ratchet teeth 192. Thus, the piston 142 is inhibited from being retracted even when the solenoid 198 is deenergized thereafter. For cancelling the locking by the locking pawl 194, the electric motor 144 is rotated forwardly with the solenoid 198 kept deenergized.

In the case where the supply of the electric current to the electric motor 144 is cut off in a state in which the piston 142 has been advanced and the braking force is being generated, the piston 142 cannot be retracted, and the braking force is kept generated. In view of such a situation, the actuator 110 includes a mechanism for retracting the piston 142 by an elastic force of an elastic member. In the motion converting mechanism 150, however, the negative (reverse) efficiency (that is efficiency when the input shaft 148 is rotated by the advancing and retracting movement of the piston 142) is smaller than the positive (forward) efficiency (that is efficiency when the piston 142 is advanced and retracted by the rotation of the input shaft 148). In view of this, the actuator 110 includes, as the mechanism, a biasing mechanism 200 configured to give, to the input shaft 148, a rotational biasing force (which may be referred to as "rotational torque") in a direction in which the piston 142 is retracted.

Figure 3A:
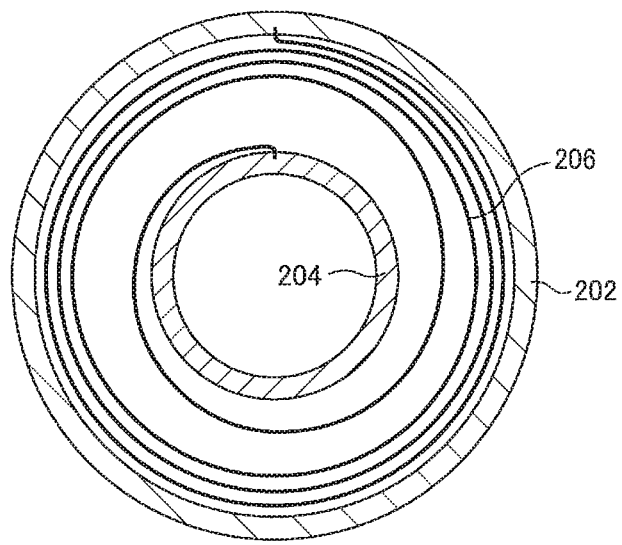
FIG. 3A is a view for explaining a biasing mechanism of the electric brake actuator shown in FIG. 2.
Figure 3B:
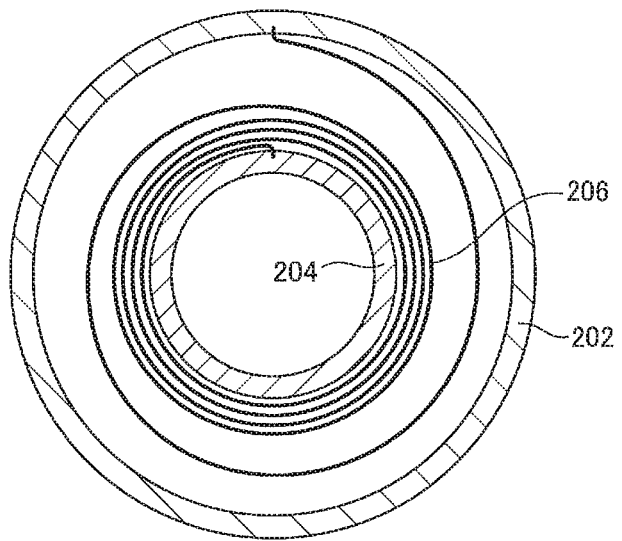
FIG. 3B is a view for explaining the biasing mechanism of the electric brake actuator shown in FIG. 2.

Specifically, the biasing mechanism 200 is constituted by an outer ring 202 fixed to the housing 140, an inner ring 204 fixed to the rear-side shaft 174 of the input shaft 148 so as to rotate therewith and disposed on an inner side of the outer ring 202, and a spiral spring 206, as the elastic member, disposed between an inner circumferential surface of the outer ring 202 and an outer circumferential surface of the inner ring 204. In a state of FIG. 2, namely, in a state in which the piston 142 is positioned at the set backward position indicated above, the spiral spring 206 is not substantially elastically deformed as shown in FIG. 3A, and the spiral spring 206 does not substantially generate the elastic force. Subsequently, as the input shaft 148 is rotated by the electric motor 144 and the piston 142 is accordingly advanced, the spiral spring 206 is gradually wound and contracted as shown in FIG. 3B, so as to generate the elastic force. That is, the elastic force whose magnitude corresponds to an amount of the advancing movement of the piston 142 that has been advanced from the set backward position acts on the input shaft 148 as a biasing force against the advancing movement of the piston 142, namely, as a biasing force in a direction in which the piston 142 is retracted. In other words, the biasing force that acts on the input shaft 148 by the spiral spring 206 increases as the piston 142 is advanced further. The rotational biasing force enables the piston 142 to be retracted even in the case where the piston 142 cannot be retracted by the electric motor 144 in the state in which the piston 142 has been advanced and the braking force is being generated.

According to the configuration explained above, the electric brake device 100 generates, utilizing a friction force, a braking force to stop rotation of the wheel, namely, a braking force to brake the vehicle in dependence on a force generated by the electric motor 144 (hereinafter referred to as "electric braking force" where appropriate). As shown in FIG. 1, the electric brake device 100 includes a controller 210 configured to control the electric brake device 100. The controller 210 includes a computer as a main constituent element and further includes drive circuits for the electric motor 144 and the solenoid 198. Electric power is supplied from a battery 212 as a constant-voltage power supply to the electric motor 144 and the solenoid 198 via the drive circuits.

[B] Basic Control of Electric Brake Device

Basic control of the electric brake device 100, specifically, control of an electric braking force $F_{EM}$, is executed such that the controller 210 controls an electric current I to be supplied to the electric motor 144 (hereinafter referred to as "supply current I" where appropriate).

Specifically, the vehicle on which the electric brake device 100 is installed has a brake pedal 214, as the brake operation member, to be operated by the driver, as shown in FIG. 1. The vehicle further has an operation force sensor 216 provided for the brake pedal 214 so as to detect a brake operation force σ applied to the brake pedal 214. The controller 210 initially determines, based on the detected brake operation force σ, a required overall braking force $F_{SUM}^*$ which is the braking force required for the vehicle as a whole and determines, based on the required overall braking force $F_{SUM}^*$, the braking force that the wheel for which the electric brake device 100 is provided should bear, namely, a target electric braking force $F_{EM}^*$ which is the electric braking force $F_{EM}$ that the electric brake device 100 should bear. The target electric braking force $F_{EM}^*$ corresponds to the braking force request, and the magnitude of the target electric braking force $F_{EM}^*$ corresponds to the degree of the braking force request.

The controller 210 determines, based on the target electric braking force $F_{EM}^*$, a target axial force $W_S^*$ as a target value of the axial force (thrust load) $W_S$ and determines, according to a feedback technique, the supply current I to the electric motor 144 such that the axial force detected by the axial-force sensor 190 becomes equal to the target axial force. The determined supply current I is supplied to the electric motor 144. The electric braking force $F_{EM}$ in accordance with the braking force request is generated by the process described above with respect to the basic control. Accordingly, the basic control can be regarded as a braking-force-request-dependent control and may be hereinafter referred to as the braking-force-request-dependent control where appropriate.

The braking-force-request-dependent control described above is based on the brake operation by the driver. In the automatic brake not based on the brake operation by the driver, for instance, the vehicle may be configured such that a signal as to the required overall braking force $F_{SUM}^*$ or the target electric braking force $F_{EM}^*$ is sent from an automatic driving system, an emergency stop system or the like to the controller 210. In this configuration, the braking-force-request-dependent control can be executed based on the signal.

[C] Special Control in Electric Brake Device According to Embodiment

There will be hereinafter explained special control in the electric brake device 100 according to the embodiment, namely, characteristic control.

i) Spacing Control

In the non-request condition of the braking force, there may occur a phenomenon in which the wheel rotates in a state in which the friction members 126 are held in sliding contact with the disc rotor 122 as the rotary body, i.e., the so-called drag phenomenon. The drag phenomenon causes a resistance to the rotation of the wheel, resulting in a loss of the vehicle driving energy, namely, deterioration in fuel consumption. In view of the drag phenomenon, the electric brake device 100 is configured such that, in the non-request condition of the braking force, the piston 142 is moved to the set backward position, i.e., the position indicated in FIG. 2, by driving of the electric motor 144. That is, the spacing control is executed for establishing the clearance existing state in which a sufficient clearance exists between the friction members 126 and the disc rotor 122. The establishment of the clearance existing state eliminates the drag phenomenon in the electric brake device 100 immediately after the braking force request has become absent. That is, the drag phenomenon is obviated or reduced, so that the electric brake device 100 enjoys a decrease in the loss of the vehicle driving energy and improvement in fuel consumption.

In FIG. 1, the clearance is exaggeratedly illustrated. The clearance is considered as a total of the following four clearances shown in FIG. 1, i.e., a clearance CL1 between the front end portion 132 of the caliper main body 130 and the backup plate 128 of the brake pad 124a, a clearance CL2 between the friction member 126 of the brake pad 124a and the disc rotor 122, a clearance CL3 between the disc rotor 122 and the friction member 126 of the brake pad 124b, and a clearance CL4 between the backup plate 128 of the brake pad 124b and the piston 142.

ii) Problems Caused by Execution of Spacing Control

Figure 4:
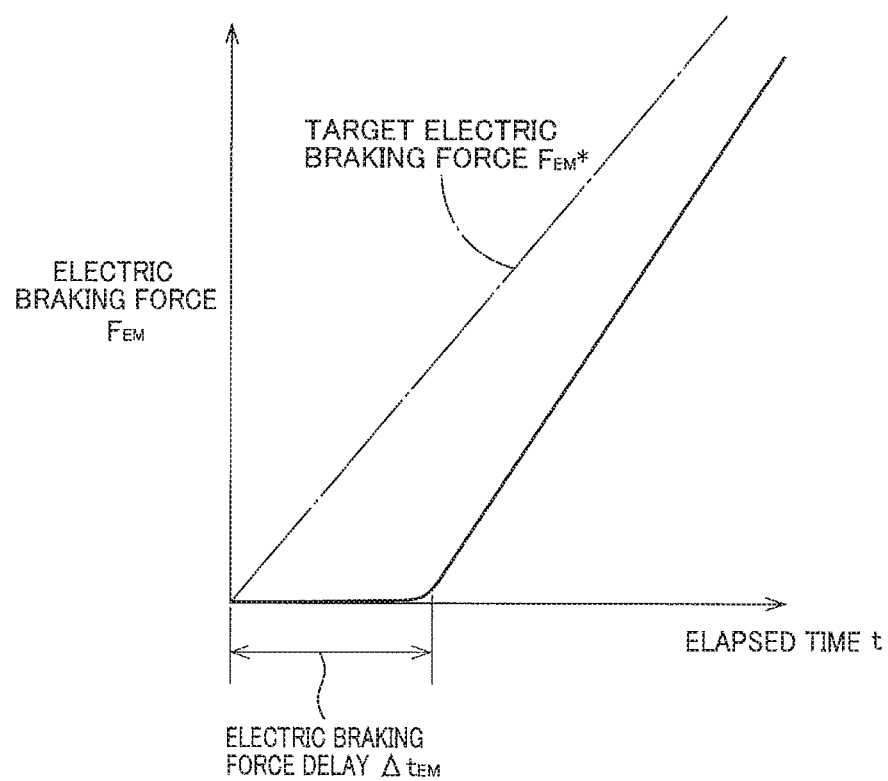
FIG. 4 is a graph for explaining a braking force delay of the electric brake device.

When the spacing control is executed, the clearance existing state described above is established in the non-request condition of the braking force. When the braking force request is generated in this state, the electric braking force $F_{EM}$ is generated at a time point when the piston 142 of the actuator 110 advances to a position at which the clearance is removed. Accordingly, it takes some time before the electric braking force $F_{EM}$ is actually generated from the time point of generation of the braking force request. That is, the response of the electric brake device 100 deteriorates. Specifically, an electric braking force delay $\Delta t_{EM}$ shown in a graph of FIG. 4 occurs. The graph of FIG. 4 schematically indicates a change in the electric braking force $F_{EM}$ with respect to an elapsed time t in a case where the braking-force-request-dependent control is executed from the time point of generation of the braking force request. In the graph, the target electric braking force $F_{EM}*$ is indicated as the braking force request by the long dashed short dashed line.

For improving the response, it may be considered that the clearance is removed to some extent in the non-request condition of the braking force. For instance, there may be stored a position $p_P$ of the piston (hereinafter referred to as "piston position" where appropriate) at a time point when the electric braking force was actually generated in a preceding braking force request, and the clearance may be removed to some extent in the non-request condition of the braking force based on the piston position. In this case, however, the clearance is not necessarily adjusted to an appropriate amount, depending upon the vehicle running condition or the like.

On the other hand, it may be considered that the piston 142 is advanced at a high speed to a position at which the clearance is removed, at the time of generation of the braking force request. This configuration, however, may cause a high-speed contact of the piston 142 against the backup plate 128 of the brake pad 124b, a high-speed contact of the front end portion 132 of the caliper main body 130 against the backup plate 128 of the brake pad 124a, and a high-speed contact of the friction members 126 of the respective brake pads 124a, 124b against the disc rotor 122. In this case, it is expected that impact noise is generated and smoothness of the operation of the actuator 110 is impaired due to an abrupt change in a speed $v_P$ of the advancing movement of the piston 142 upon contact thereof as described above. (The speed of the advancing movement of the piston 142 may be hereinafter referred to as "piston advancing speed $v_P$" where appropriate.).

iii) Clearance Removing Control

In the electric brake device 100, therefore, a clearance removing control for removing the clearance is executed from the time point of generation of the braking force request, and the braking-force-request-dependent control is executed after the clearance removing control has been ended.

Figure 5:
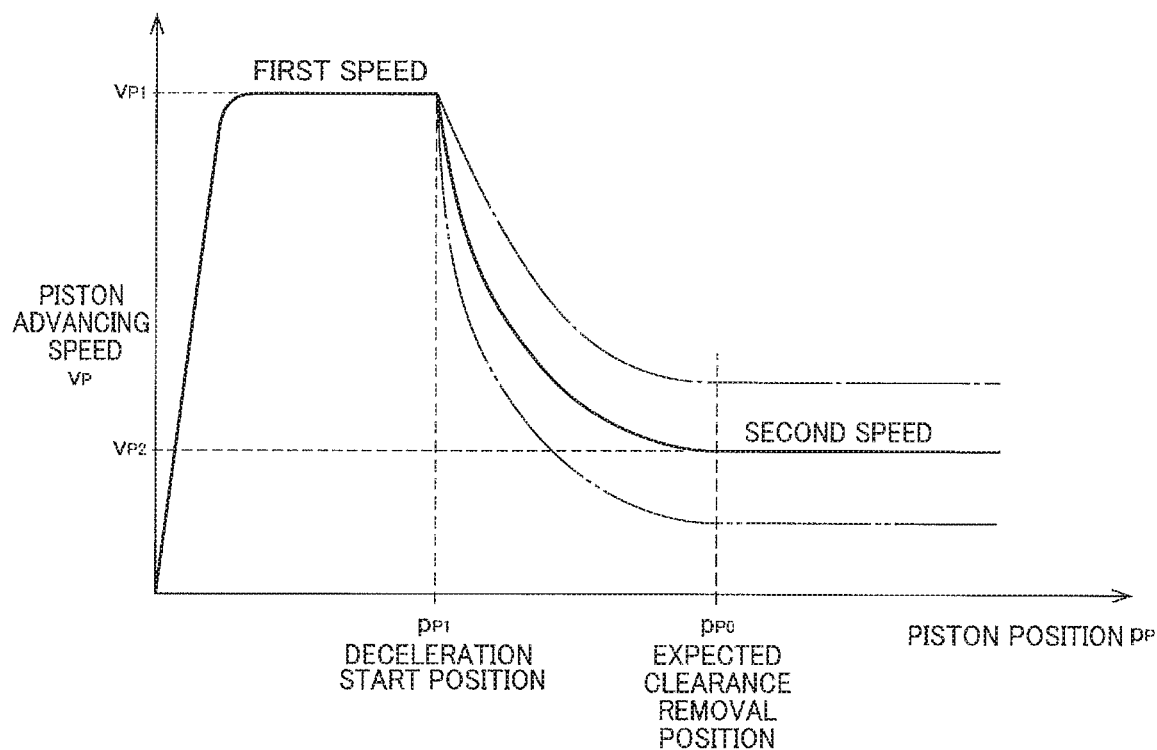
FIG. 5 is a graph showing a change in a piston advancing speed in the case where a clearance removing control is executed in the electric brake device of the embodiment.

In short, the clearance removing control is for removing the clearance by advancing the piston 142 at a first speed $v_{P1}$ (which is a relatively high speed) when the braking force request is generated and by subsequently advancing the piston 142 such that the advancing speed of the piston is reduced from the first speed $v_{P1}$ to a second speed $v_{P2}$. FIG. 5 is a graph showing a change in the piston advancing speed $v_P$ with respect to the piston position $p_P$ in the case where the clearance removing control is executed.

Referring to the graph of FIG. 5, the clearance removing control will be explained. The first speed $v_{P1}$ is a speed when an admissible maximum current determined based on performance of the electric motor 144, the actuator 110, and the battery 212 is supplied to the electric motor 144. The first speed $v_{P1}$ is equal to the piston advancing speed $v_P$ that may be regarded as the highest speed. (The admissible maximum current will be hereinafter referred to as "maximum current $I_{MAX}$" where appropriate.) The second speed $v_{P2}$ is set based on a speed at which the piston 142 is estimated to advance in the braking-force-request-dependent control after the clearance has been removed. After the clearance has been removed, the piston 142 advances while elastically deforming the friction members 126. The amount of elastic deformation depends on: a spring constant of the friction members 126; and the electric braking force $F_{EM}$ being generated. Accordingly, the piston advancing speed $v_P$ at that time depends on an increase gradient of the electric braking force $F_{EM}$. In view of this, the second speed $v_{P2}$ is determined in accordance with an increase gradient of the degree of the braking force request, namely, a target electric braking force change gradient $\Delta F_{EM}*$ that is a change gradient of the target electric braking force $F_{EM}*$. It is noted that the target electric braking force change gradient $\Delta F_{EM}*$ is an increase gradient when the target electric braking force $F_{EM}*$ is increasing. Specifically, the controller 210 stores, in advance, map data representing a relationship between the target electric braking force change gradient $\Delta F_{EM}*$ and the piston advancing speed $v_P$ after removal of the clearance. Based on the data, the second speed $v_{P2}$ is determined to be higher when the target electric braking force change gradient $\Delta F_{EM}*$ is larger. In the graph of FIG. 5, the long dashed short dashed line represents a case in which the target electric braking force change gradient $\Delta F_{EM}*$ is large while the long dashed double-short dashed line represents a case in which the target electric braking force change gradient $\Delta F_{EM}*$ is small.

The clearance removing control is ended when the piston position $p_P$ becomes equal to a predetermined position $p_{P0}$ at which the clearance is estimated to be removed. As explained above, the controller 210 recognizes, all the time, the piston position $p_P$ with respect to the set backward position set at 0, based on the detection signal of the resolver 188. The controller 210 further recognizes the piston position $p_P$ at a time point when the electric braking force $F_{EM}$ was actually generated in a preceding braking force request, based on the axial force $W_S$ detected by the axial-force sensor 190 for detecting the electric braking force $F_{EM}$ being actually generated. The controller 210 sets the position $p_P$ as the predetermined position $p_{P0}$ when the braking force request is newly made. The predetermined position $p_{P0}$ will be hereinafter referred to as an expected clearance removal position $p_{P0}$ or an expected braking force generation position $p_{P0}$.

For achieving both of good response and smooth operation of the electric brake device 100, the deceleration of the piston 142 from the first speed $v_{P1}$ to the second speed $v_{P2}$ in the clearance removing control is preferably started when a removed amount of the clearance becomes equal to a set amount held in a range from not less than ⅓ to not greater than ⅔ of the amount of the clearance which has existed before the execution of the clearance removing control. In other words, it is preferable to advance the piston 142 at the first speed $v_{P1}$ until the removed amount of the clearance becomes equal to the set amount described above. In view of this, in the present clearance removing control, the deceleration of the piston 142 from the first speed $v_{P1}$ to the second speed $v_{P2}$ starts when the removed amount of the clearance becomes equal to about half the amount of the clearance which has existed before the execution of the clearance removing control. More specifically, a piston position, at which a distance from the set backward position is equal to half a distance between the set backward position and the expected clearance removal position $p_{P0}$, is set as a deceleration start position $p_{P1}$ ($=p_{P0}/2$). When the piston 142 is advanced to that position $p_{P1}$, the first speed $v_{P1}$ starts to be reduced to the second speed $v_{P2}$. It is noted that the piston advancing speed $v_P$ becomes equal to the first speed $v_{P1}$ before the piston 142 advanced from the set backward position reaches the deceleration start position.

In the clearance removing control, a deceleration gradient $\Delta v_P$ gradually becomes smaller in the process of the deceleration from the first speed $v_{P1}$ to the second speed $v_{P2}$. The deceleration gradient $\Delta v_P$ is a decrease gradient of the piston advancing speed $v_P$ with respect to a distance by which the piston 142 is advanced, namely, with respect to the piston position pp. In other words, the piston advancing speed is reduced such that a line representing a change in the piston advancing speed $v_P$ in the process of the deceleration forms a downwardly convex shape as shown in the graph of FIG. 5. In other words, the piston 142 is advanced such that a rate of the deceleration gradually becomes smaller. Specifically, the controller 210 stores map data representing a relationship between the piston position $p_P$ and the piston advancing speed $v_P$, for various manners of the change in the piston advancing speed $v_P$ to deal with different values of the second speed $v_{P2}$. Every time the piston 142 is advanced, the controller 210 determines, based on the data, the target advancing speed $v_P^*$ at which the piston 142 should be advanced. Further, based on the target advancing speed $v_P^*$, the controller 210 determines a deceleration current which is the supply current I to be supplied to the electric motor 144 in the process of the deceleration of the piston 142, so as to control the actuator 110 based on the determined supply current I. The deceleration gradient $\Delta v_P$ is thus changed, so that the change in the advancing speed $v_P$ of the piston 142 is small upon switching from the clearance removing control to the braking-force-request-dependent control so as to ensure smooth operation of the electric brake device 100, even in the case where the piston position $p_P$ at which the clearance is actually removed deviates somewhat from the expected clearance removal position $p_{P0}$.

[D] Flow of Control Process Including Clearance Removing Control

Figure 6:
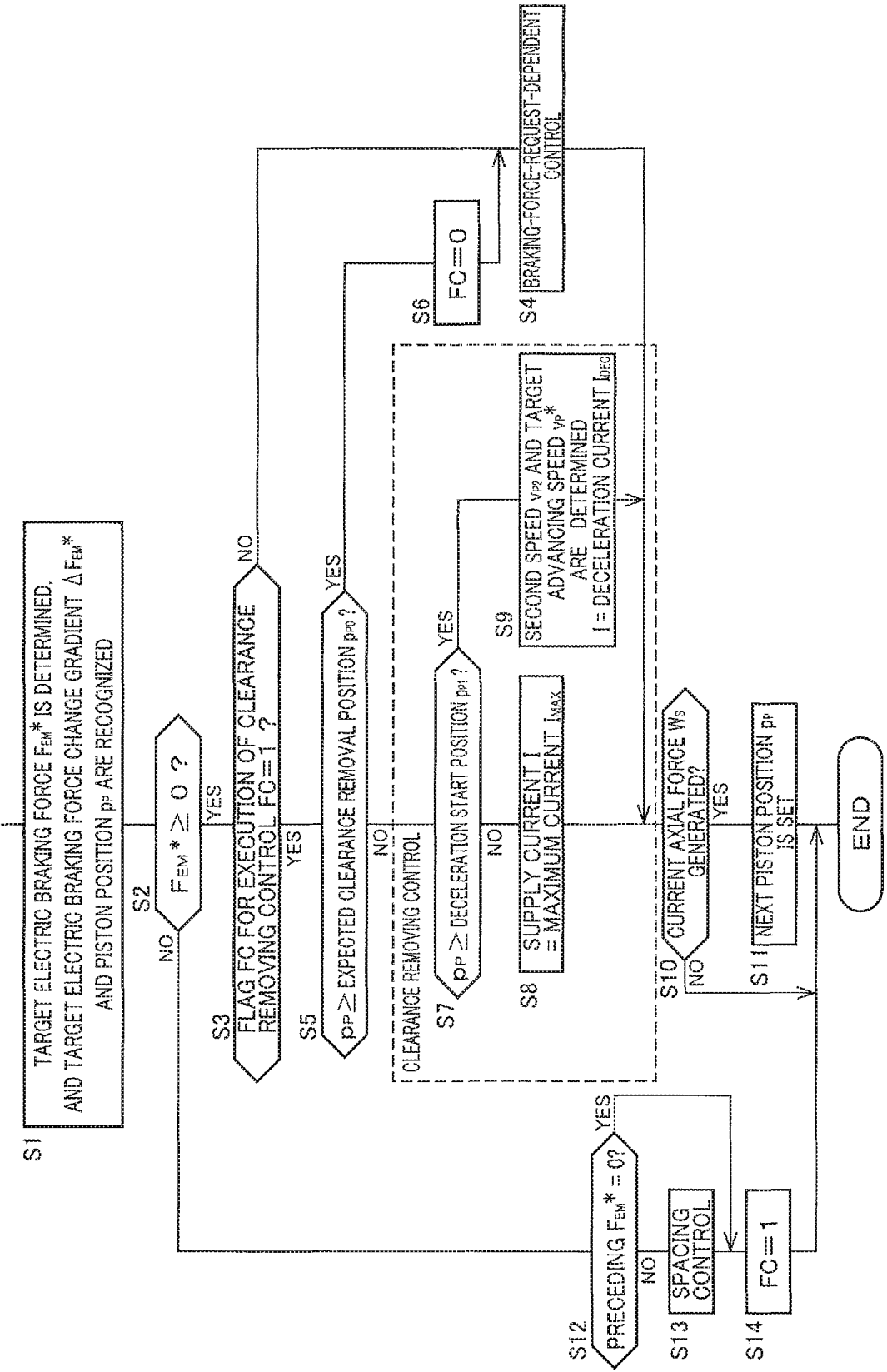
FIG. 6 is a flowchart showing a brake control program executed in the electric brake device of the embodiment.

The controls in the electric brake device 100 of the present embodiment including the clearance removing control described above are executed such that the controller 210 repeatedly executes a brake control program indicated by a flowchart of FIG. 6 at a short time pitch from several to several tens of milliseconds (msec). The control process according to the brake control program will be explained referring to the flowchart of FIG. 6. It is noted that the following explanation is limited for the braking force request based on the brake operation by the driver.

In the process according to the brake control program, step S1 is implemented at which the target electric braking force $F_{EM}^*$ as the degree of the braking force request is determined based on the brake operation force σ obtained from the detection signal of the operation force sensor 216. Further, the target electric braking force change gradient $\Delta F_{EM}^*$ is specified based on: the determined target electric braking force $F_{EM}^*$; and the target electric braking force $F_{EM}^*$ determined in preceding execution of the program, and the piston position $p_P$ which is the position of the piston 142 at the current time point is specified based on the detection signal of the resolver 188. Here, "step S1" is abbreviated as "S1", and other steps are similarly abbreviated.

At S2, it is determined, based on the determined target electric braking force $F_{EM}$, whether the brake operation is being performed by the driver. When the target electric braking force $F_{EM}^*$ is not less than 0, the brake operation is being performed by the driver. In this case, it is determined at S3 whether the clearance removing control is being executed, based on a value of a flag FC for execution of the clearance removing control. The value of the flag FC for execution of the clearance removing control is set to "1" in a condition in which the clearance removing control is being executed or should be executed while the value of the flag FC is set to "0" in a condition in which the clearance removing control is not being performed or should not be executed. The initial value of the flag FC is "1".

When it is determined that the clearance removing control is not being performed or should not be executed, the basic control, namely, the braking-force-request-dependent control, is executed at S4, so as to control the electric motor 144 of the actuator 110 based on the target electric braking force $F_{EM}^*$ as the degree of the braking force request. Thus, the electric braking force $F_{EM}$ corresponding to the target electric braking force $F_{EM}^*$ is generated.

On the other hand, when it is determined that the clearance removing control is being executed or should be executed, it is determined at S5 whether the piston 142 has reached the expected clearance removal position $p_{P0}$. When it is determined that the piston 142 has reached the expected clearance removal position $p_{P0}$, the value of the flag FC for execution of the clearance removing control is set to "0" at S6 so as to end the clearance removing control, and the braking-force-request-dependent control is subsequently executed at S4. When it is determined that the piston 142 does not yet reach the expected clearance removal position $p_{P0}$, the clearance removing control (a portion of the flowchart enclosed by the dashed line) is executed.

In the process executed in the clearance removing control, it is determined at S7 whether the piston 142 has reached the deceleration start position $p_{P1}(=p_{P0}/2)$. When it is determined that the piston 142 does not yet reach the deceleration start position $p_{P1}$, the supply current I to the electric motor 144 is determined to be equal to the maximum current $I_{MAX}$ at S8. The determined maximum current $I_{MAX}$ is supplied to the electric motor 144, so that the piston 142 is advanced at the first speed $v_{P1}$. On the other hand, when it is determined that the piston 142 has reached the deceleration start position $p_{P1}$, the control flow goes to S9 to determine, by referring to the map data explained above, the second speed $v_{P2}$ to which the advancing speed of the piston 142 should finally become equal as a result of the deceleration in the clearance removing control, based on the target electric braking force change gradient $\Delta F_{EM}^*$. Further, at S9, the target advancing speed $v_P^*$ at which the piston 142 should be advanced at the current time point is determined, by referring to the map data explained above, based on the determined second speed $v_{P2}$ and the piston position $p_P$ at the current time point. Based on the determined target advancing speed $v_P^*$, the current I that should be supplied to the electric motor 144 at the current time point is determined as a deceleration current $I_{DEC}$, and the deceleration current $I_{DEC}$ is supplied to the electric motor 144.

After the process executed in the clearance removing control or after the process executed in the braking-force-request-dependent control, S10 is implemented to determine whether the axial force $W_S$ detected by the axial-force sensor 190 has been generated for the first time after the generation of the braking force request in current execution of the program, namely, to determine whether the electric braking force $F_{EM}$ has been actually generated for the first time after the generation of the braking force request. In other words, it is determined whether the clearance has been actually removed. When it is determined that the clearance has been currently removed, S11 is implemented to set the piston position $p_P$ at the current time point as the expected clearance removal position $p_{P0}$ to be used when the program is executed in a next brake operation.

When it is determined at S2 that the brake operation is not being performed, it is determined at S12 whether the brake operation has ended in preceding execution of the program. When an affirmative determination is made at S12, the control flow goes to S13 to execute the spacing control, namely, the control for retracting the piston 142 to the set backward position so as to allow a predetermined clearance to exist. Further, when it is determined that the brake operation is not being performed, the value of the flag FC for execution of the clearance removing control is reset to "1" at S14.

[E] Modification

In the electric brake device 100 according to the illustrated embodiment, the target electric braking force $F_{EM}*$ as the degree of the braking force request is determined based on the brake operation force σ. The target electric braking force $F_{EM}*$ may be determined based on the brake operation amount which is the operation amount of the brake pedal 214 as the brake operation member or may be determined based on both of the brake operation force σ and the brake operation amount. The control process in the electric brake device 100 of the illustrated embodiment explained above is for the braking force request based on the brake operation by the driver. The control process explained above is applicable to the braking force request by the automatic brake, for instance. Specifically, in a case where a signal as to the required overall braking force $F_{SUM}*$, which is the braking force required by the vehicle as a whole, is sent to the controller 210 from a controller for the automatic brake, the controller 210 may be configured to determine, based on the required overall braking force $F_{SUM}*$, the target electric braking force $F_{EM}*$ of the electric brake device 100, so as to execute the control process explained above.

In the case where the electric brake device 100 according to the illustrated embodiment is installed on a four-wheeled vehicle, the electric brake device 100 may be provided for each of the four wheels of the vehicle. Further, in the four-wheeled vehicle, the electric brake device 100 may be provided for each of two of the four wheels, and a hydraulic brake device may be provided for the other two of the four wheels. Moreover, a vehicle equipped with a regenerative brake device may additionally include the electric brake device 100.

What is claimed is:

1. An electric brake device for a vehicle, comprising: a rotary body configured to rotate with a wheel; a friction member configured to be pushed onto the rotary body; an actuator configured to advance a piston by an electric motor so as to push the friction member onto the rotary body; and a controller configured to control the actuator, the electric brake device being configured such that, when no braking force request is made, the piston is retracted to a set backward position so as to allow a clearance to exist between the friction member and the rotary body,
wherein the controller is configured to execute, for the actuator,
a clearance removing control in which the piston is advanced at a first speed and subsequently advanced such that an advancing speed of the piston is reduced from the first speed to a second speed, so as to remove the clearance, the clearance removing control being executed when the braking force request is generated, and
a braking-force-request-dependent control in which a braking force in accordance with a degree of the braking force request is generated, the braking-force-request-dependent control being executed after execution of the clearance removing control, and
wherein the second speed is determined based on a speed at which the piston is estimated to advance in the braking-force-request-dependent control that is executed after the clearance has been removed.

2. The electric brake device according to claim 1, wherein the first speed is equal to a speed when an admissible maximum current is supplied to the electric motor.

3. The electric brake device according to claim 1, wherein the second speed is determined based on an increase gradient of the degree of the braking force request.

4. An electric brake device for a vehicle, comprising: a rotary body configured to rotate with a wheel; a friction member configured to be pushed onto the rotary body; an actuator configured to advance a piston by an electric motor so as to push the friction member onto the rotary body; and a controller configured to control the actuator, the electric brake device being configured such that, when no braking force request is made, the piston is retracted to a set backward position so as to allow a clearance to exist between the friction member and the rotary body,
wherein the controller is configured to execute, for the actuator,
a clearance removing control in which the piston is advanced at a first speed and subsequently advanced such that an advancing speed of the piston is reduced from the first speed to a second speed, so as to remove the clearance, the clearance removing control being executed when the braking force request is generated, and
a braking-force-request-dependent control in which a braking force in accordance with a degree of the braking force request is generated, the braking-force-request-dependent control being executed after execution of the clearance removing control, and
wherein the controller is configured to end the clearance removing control at a time point when the piston advances to a position at which the clearance is estimated to be removed and to execute the braking-force-request-dependent control from the time point.

5. An electric brake device for a vehicle, comprising: a rotary body configured to rotate with a wheel; a friction member configured to be pushed onto the rotary body; an actuator configured to advance a piston by an electric motor so as to push the friction member onto the rotary body; a controller configured to control the actuator, the electric brake device being configured such that, when no braking force request is made, the piston is retracted to a set backward position so as to allow a clearance to exist between the friction member and the rotary body,
wherein the controller is configured to execute, for the actuator,
a clearance removing control in which the piston is advanced at a first speed and subsequently advanced such that an advancing speed of the piston is reduced from the first speed to a second speed, so as to remove the clearance, the clearance removing control being executed when the braking force request is generated, and
a braking-force-request-dependent control in which a braking force in accordance with a degree of the braking force request is generated, the braking-force-request-dependent control being executed after execution of the clearance removing control, and
wherein, in the clearance removing control, the piston is advanced such that the advancing speed of the piston is reduced from the first speed to the second speed while a decrease gradient of the advancing speed of the piston is gradually reduced.

6. An electric brake device for a vehicle, comprising: a rotary body configured to rotate with a wheel; a friction member configured to be pushed onto the rotary body; an actuator configured to advance a piston by an electric motor so as to push the friction member onto the rotary body; and a controller configured to control the actuator, the electric brake device being configured such that, when no braking force request is made, the piston is retracted to a set backward position so as to allow a clearance to exist between the friction member and the rotary body, wherein the controller is configured to execute, for the actuator, a clearance removing control in which the piston is advanced at a first speed and subsequently advanced such that an advancing speed of the piston is reduced from the first speed to a second speed, so as to remove the clearance, the clearance removing control being executed when the braking force request is generated, and a braking-force-request-dependent control in which a braking force in accordance with a degree of the braking force request is generated, the braking-force-request-dependent control being executed after execution of the clearance removing control, wherein the electric brake device further comprises a sensor configured to detect the braking force being actually generated by the electric brake device, and wherein, in the braking-force-request-dependent control, a current to be supplied to the electric motor is controlled such that the braking force detected by the sensor coincides with the degree of the braking force request.

7. The electric brake device according to claim 6, wherein the degree of the braking force request is estimated at least based on a brake operation force applied to a brake operation member by a driver.

8. An electric brake device for a vehicle, comprising: a rotary body configured to rotate with a wheel; a friction member configured to be pushed onto the rotary body; an actuator configured to advance a piston by an electric motor so as to push the friction member onto the rotary body; and a controller configured to control the actuator, the electric brake device being configured such that, when no braking force request is made, the piston is retracted to a set backward position so as to allow a clearance to exist between the friction member and the rotary body, wherein the controller is configured to execute, for the actuator, a clearance removing control in which the piston is advanced at a first speed and subsequently advanced such that an advancing speed of the piston is reduced from the first speed to a second speed, so as to remove the clearance, the clearance removing control being executed when the braking force request is generated, and a braking-force-request-dependent control in which a braking force in accordance with a degree of the braking force request is generated, the braking-force-request-dependent control being executed after execution of the clearance removing control, and wherein the clearance removing control is executed such that the piston is advanced at the first speed until a removed amount of the clearance becomes equal to a set amount held in a range from not less than ⅓ to not greater than ⅔ of an amount of the clearance which has existed before the execution of the clearance removing control.

* * * * *